(12) United States Patent
Letkeman

(10) Patent No.: US 9,830,227 B2
(45) Date of Patent: Nov. 28, 2017

(54) PERFORMING A CLOSURE MERGE OPERATION

(71) Applicant: International Business Machines Corporation, Armonk, NY (US)

(72) Inventor: Kimberly D. Letkeman, Nepean (CA)

(73) Assignee: International Business Machines Corporation, Armonk, NY (US)

( * ) Notice: Subject to any disclaimer, the term of this patent is extended or adjusted under 35 U.S.C. 154(b) by 361 days.

(21) Appl. No.: 14/561,515

(22) Filed: Dec. 5, 2014

(65) Prior Publication Data

US 2016/0162363 A1    Jun. 9, 2016

(51) Int. Cl.
*G06F 9/44*      (2006.01)
*G06F 11/14*     (2006.01)
*G06F 17/30*     (2006.01)

(52) U.S. Cl.
CPC ............ *G06F 11/1451* (2013.01); *G06F 8/71* (2013.01); *G06F 11/1464* (2013.01); *G06F 17/30174* (2013.01); *G06F 17/30224* (2013.01); *G06F 2201/84* (2013.01)

(58) Field of Classification Search
CPC ............ G06F 11/1451; G06F 11/1464; G06F 17/30174; G06F 17/30224; G06F 2201/84; G06F 17/30356; G06F 17/3023
See application file for complete search history.

(56) References Cited

U.S. PATENT DOCUMENTS

| 6,772,165 | B2 | 8/2004 | O'Carroll |
| 7,464,097 | B2 | 12/2008 | Goetz et al. |
| 7,502,800 | B2 | 3/2009 | Beier et al. |
| 7,506,011 | B2 | 3/2009 | Liu et al. |

(Continued)

FOREIGN PATENT DOCUMENTS

| JP | 9081371 A | 3/1997 |
| WO | 2014185837 A1 | 11/2014 |

OTHER PUBLICATIONS

International Search Report and the Written Opinion of the International Search Authority, PCT/IB2015/0590002, International Filing Date Nov. 20, 2015, dated Mar. 24, 2016, 12 pages.

(Continued)

*Primary Examiner* — Jorge A Casanova
(74) *Attorney, Agent, or Firm* — Daniel R. Simek

(57) ABSTRACT

In a method for data management, one or more processors identifying a source closure, a target file set, and a previously merged closure, wherein the source closure is a closure of files that includes changed files to merge into the target file set, and wherein the previously merged closure is a closure of files previously merged into the target file set. The method further includes one or more processors loading the identified source closure, the previously merged closure, and a closure of ancestor files shared by the identified source closure and the previously merged closure into a merge session. The method further includes one or more processors determining one or more file merge conflicts in the merge session based on differences between a comparison of the identified source closure to the closure of ancestor files and a comparison of the previously merged closure to the closure of ancestor files.

25 Claims, 5 Drawing Sheets

(56) References Cited

U.S. PATENT DOCUMENTS

| | | | |
|---|---|---|---|
| 7,526,507 | B2 | 4/2009 | Holloway et al. |
| 7,865,465 | B2 | 1/2011 | Vierich et al. |
| 8,086,560 | B2 | 12/2011 | Hernandez-Sherrington et al. |
| 8,365,140 | B2 | 1/2013 | Heyhoe et al. |
| 8,661,063 | B2 * | 2/2014 | Mason, Jr. .......... G06F 17/3023 707/802 |
| 8,700,569 | B1 | 4/2014 | Wilson et al. |
| 2004/0205539 | A1 | 10/2004 | Mak et al. |
| 2007/0136394 | A1 * | 6/2007 | Cowan ...................... G06F 8/71 |
| 2007/0282918 | A1 | 12/2007 | Holloway et al. |
| 2008/0028003 | A1 | 1/2008 | Brueggemann |
| 2008/0235579 | A1 | 9/2008 | Champion et al. |
| 2011/0161931 | A1 | 6/2011 | Camelon et al. |
| 2012/0180024 | A1 * | 7/2012 | Gonzalez .................. G06F 8/71 717/109 |
| 2013/0036400 | A1 * | 2/2013 | Bak .......................... G06F 8/71 717/101 |
| 2013/0262419 | A1 | 10/2013 | Kilian et al. |
| 2014/0222793 | A1 | 8/2014 | Sadkin et al. |
| 2016/0034433 | A1 * | 2/2016 | Yamat ................. G06F 17/2288 715/229 |

OTHER PUBLICATIONS

Ginige, et al., "A Mechanism for Efficient Management of Changes in BPEL based Business Processes: An Algebraic Methodology", IEEE International Conference on e-Business Engineering (ICEBE'06), © 2006 IEEE, Downloaded on May 31, 2009, <http://www2.connputer.org.portal/web/csdl/doi/10.1109/ICEBE.2006.7>.

Hodel-Widmer, T., "Concept and prototype of a collaborative business process environment for document processing", Data & Knowledge Engineering, vol. 52, Issue 1, Jan. 2005, pp. 61-120, <http://www.science.direct.com/science/article/pii/s0169023x0400862>.

Malluri, S., "Project Definition and Versioning", Code Project, Feb. 25, 2013, Article Copyright 2013 by Suresh Malluri, Everything else Copyright © CodeProject, 1999-2014, <http://www.codeproject.com/Articles/551863/Project-Definition-and-Versioning>.

Nguyen, T., "Model-based Version and Configuration Management for a Web Engineering Lifecycle", WWW 2006, May 23-26, 2006, Edinburgh, Scotland, Copyright held by the International World Wide Web Conference Committee (IW3C2), pp. 437-446, <http://portal.acm.org/citation.cfm?id=1135777.1135842>.

"Comparing and merging UML models in IBM Rational Software Architect: Part 4", Aug. 2, 2005, IBM, <http://www.ibm.com/developerworks/rational/library/05/0809_CVS4/>.

"Method of Merging Huge Models with Full-Context Using Sparse Model Sections", The IP.com Prior Art Database, IPCOM000199646D, Published Sep. 13, 2010, Copyright 2009-2014 IP.com, <http://ip.com/IPCOM/000199646>.

* cited by examiner

PERFORMING A CLOSURE MERGE OPERATION

BACKGROUND OF THE INVENTION

The present invention relates generally to the field of data management, and more particularly to performing a merge operation.

A mathematically accurate closure is a group of files that reference elements in one another such that navigation can be achieved from any element in any document to any other element in any document. Additionally, a closure of files permits intra-closure inter-model navigation between any two nodes but have no further references or links to information in files outside of the closure. A logical model is comprised of many files that should be kept consistent across time. Therefore, changed files need to be synchronized in order to avoid data corruption.

In software engineering, multiple developers can each work on and make changes to the same set of data (e.g., a closure of models or other data, etc.) in parallel. A parallel development process leads to multiple concurrent data sets (e.g., releases, variants, etc.) that include updates to the original set of data. In order to maintain consistency in the parallel development cycle, the sets of data that have been modified by different developers should undergo merge operations periodically.

SUMMARY

Aspects of the present invention disclose a method, computer program product, and system for data management. The method includes one or more processors identifying a source closure, a target file set, and a previously merged closure, wherein the source closure is a closure of files that includes changed files to merge into the target file set, and wherein the previously merged closure is a closure of files previously merged into the target file set. The method further includes one or more processors loading the identified source closure, the previously merged closure, and a closure of ancestor files shared by the identified source closure and the previously merged closure into a merge session. The method further includes one or more processors determining one or more file merge conflicts in the merge session based on differences between a comparison of the identified source closure to the closure of ancestor files and a comparison of the previously merged closure to the closure of ancestor files.

DETAILED DESCRIPTION

Embodiments of the present invention allow for performing a merge operation on a closure of files. In a parallel development cycle, a developer selects a closure of files (e.g., models) to work on. The developer loads the closure into a workspace and makes changes to files in the closure. Meanwhile, other developers are also modeling and making changes to one or more of the same files that they had loaded using the same closure, a subset closure, or a superset closure on their respective workstations. At a point, the changes that the one or more developers make to the closure are merged (e.g., in a shared integration stream). Any conflicts that are detected during the merge operation are identified and presented to a user, the user provides input to resolve the conflicts and potentially change the state of non-conflicting deltas, and the closure of models is updated based on the user input. Embodiments of the present invention define a closure as any group of models as defined by a specified closure manifest or by the files' presence in the user's current workspace or working context (e.g. stream, component, repository, etc.).

Some embodiments of the present invention recognize that a logical model is comprised of many files that should be kept consistent across time. Therefore, changed files need to be synchronized in order to avoid data corruption. In order to avoid data corruption, all changed files can be processed as an atomic unit, making certain that the stored files are not out of synchronization with one another. Since it is possible to perform an operation that moves data between fragments, structural errors can arise in a model when files are changed in parallel by developers on different workstations or teams. Another opportunity for data corruption arises when multiple fragments have been loaded into memory and changed, but only some of the fragments are subsequently checked into a software configuration management system and then delivered into the integration stream.

Implementation of embodiments of the invention may take a variety of forms, and exemplary implementation details are discussed subsequently with reference to the Figures.

Figure 1:
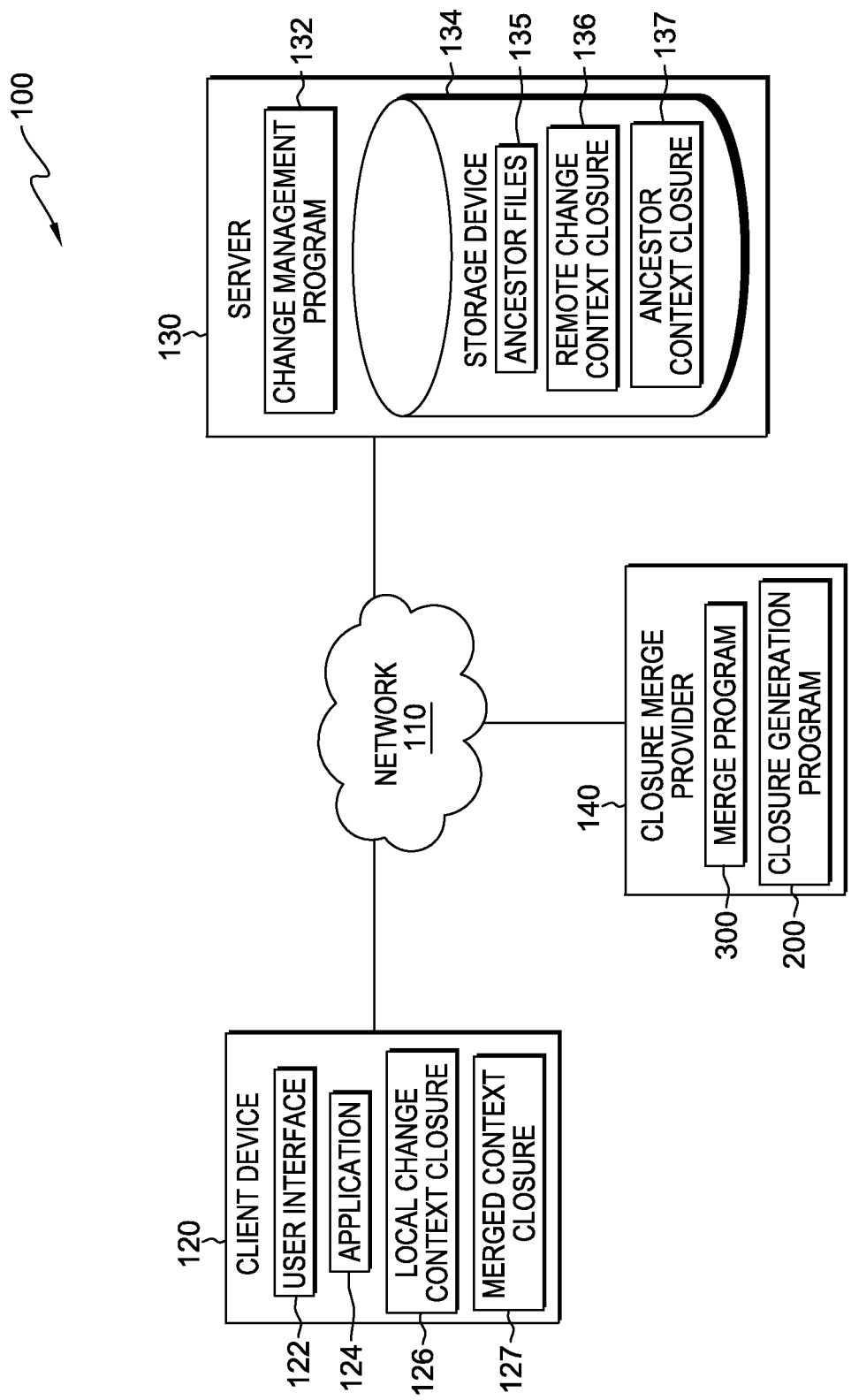
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

An embodiment of data processing environment 100 includes client device 120, server 130, and closure merge provider 140, all interconnected over network 110. In an example embodiment, client device 120 can access data stored on server 130 and utilize closure merge provider 140 to access data on server 130. In one embodiment, client device 120, server 130, and closure merge provider 140 communicate through network 110. Network 110 can be, for example, a local area network (LAN), a telecommunications network, a wide area network (WAN) such as the Internet, or any combination of the three, and include wired, wireless, or fiber optic connections. In general, network 110 can be any combination of connections and protocols that will support communications between client device 120, server 130, and closure merge provider 140, in accordance with embodiments of the present invention.

In various embodiments of the present invention, client device 120 may be a workstation, personal computer, personal digital assistant, mobile phone, or any other device capable of executing computer readable program instructions, in accordance with embodiments of the present invention. In general, client device 120 is representative of any electronic device or combination of electronic devices capable of executing computer readable program instructions. Client device 120 may include components as depicted and described in further detail with respect to FIG. 5, in accordance with embodiments of the present invention.

Client device 120 includes user interface 122, application 124, local change context closure 126, and merged context closure 127. User interface 122 is a program that provides an interface between a user of client device 120 and a plurality of applications that reside on the client device. A user interface, such as user interface 122, refers to the information (such as graphic, text, and sound) that a program presents to a user and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API).

Application 124 is a software application that an individual utilizing client device 120 can utilize (e.g., via user interface 122) to interface with closure merge provider 140 and server 130. In one embodiment, client device 120 utilizes application 124 to access files and data stored on server 130, make changes to the files and data, and push the changed files and data (e.g., local change context closure 126) to server 130 (via closure merge provider 140). In another embodiment, application 124 is an editing application, compatible with files and data stored on server 130. In an example embodiment, application 124 is a client-side application that communicates with change management program 132 (on server 130) and closure merge provider 140. In another embodiment, application 124 is a client application in an integrated development environment (e.g., a software code editor), which allows a user of client device 120 to interact with change management program 132 on server 130.

Local change context closure 126 is a set of changes to a closure of files (e.g., from server 130) made by a user of client device 120. In an example embodiment, client device 120 requests a set of files that are stored on server 130, and client device 120 receives a closure of files that includes the requested files (e.g., via closure generation program 200 on closure merge provider 140). In this embodiment, a user of client device 120 (e.g., a local developer or modeler) makes changes to the closure of files, creating local change context closure 126, which includes the closure and all changes. In various embodiments, changes included in local change context closure 126 can include re-factoring operations across model and file boundaries, file deletions, or other forms of changes made to model or group of related models as embodied by a closure of files.

Merged context closure 127 is a copy of a file closure that is present in memory and is undergoing a merge operation (e.g., in a merge session via merge program 300). In one embodiment, at the initiation of a merge session merged context closure 127 is a closure of ancestor files (e.g., ancestor context closure 137) that correspond to the files in local change context closure 126. In example embodiments, during the merge session, merge program 300 processes merged context closure 127 based on user input, which results in merged context closure including an approved closure of files for merger into a target system.

In example embodiments, server 130 can be a desktop computer, a computer server, or any other computer systems known in the art. In certain embodiments, server 130 represents computer systems utilizing clustered computers and components (e.g., database server computers, application server computers, etc.) that act as a single pool of seamless resources when accessed by elements of data processing environment 100 (e.g., client device 120 and closure merge provider 140). In general, server 130 is representative of any electronic device or combination of electronic devices capable of executing computer readable program instructions. Server 130 may include components as depicted and described in further detail with respect to FIG. 5, in accordance with embodiments of the present invention.

Server 130 includes change management program 132 and storage device 134. Change management program 132 is a program that manages models and files that are hosted by server 130 (e.g., in storage device 134). In an example embodiment, change management program 132 provides tools and runtime support for files and models hosted by server 130. Change management program 132 facilitates merging modifications made to files and models hosted by server 130 though communication with application 124 (e.g., via closure merge provider 140). In various embodiments, change management program 132 is a software component of an integrated development environment (IDE) and includes a workspace and extensible plug-ins for customizing models and files in the environment (e.g., on server 130, on client device 120, or on both).

Storage device 134 includes ancestor files 135, remote change context closure 136, and ancestor context closure 137. Storage device 134 can be implemented with any type of storage device, for example, persistent storage 508, which is capable of storing data that may be accessed and utilized by server 130, such as a database server, a hard disk drive, or a flash memory. In other embodiments, storage device 134 can represent multiple storage devices within server 130.

Ancestor files 135 includes the models and files that are hosted by server 130. In one embodiment, ancestor files 135 stores, for each file and model hosted by server 130, the historical versions of files and models over a period of time. For example, if a file has undergone a series of approved modifications, ancestor files 135 includes each changed instance of the file, as well as the most up to date version of the file. In some embodiments, historical file instances are stored as either a complete file or as a delta from the previous historical instance to generate the new instance when requested. In another embodiment, ancestor files 135 includes metadata that indicates information associated with the files, for example, a date and time associated with an approved modification to a file.

Remote change context closure 136 is one or more sets of recently approved changes to a closure of files that are hosted by server 130 and have been merged to update the corresponding files. In one embodiment, remote change context closure 136 is the most recent set of approved and merged changes for the closure of files that corresponds to local change context closure 126 (i.e., changes to the same closure of files). In various embodiments, changes included in remote change context closure 136 can include re-factoring operations across model and file boundaries, file deletions, or other forms of changes made to a closure of files. Remote change context closure 136 can include changes previously made by a user of client device 120, a user locally accessing server 130, or another user utilizing a computing device (not shown).

Ancestor context closure 137 is a closure of files from ancestor files 135 that corresponds to the closure of files in local change context closure 126 and remote change context closure 136. In one embodiment, ancestor context closure 137 is composed of a closure of the most recent files (from ancestor files 135) in local change context closure 126 and remote change context closure 136 from which each local and remote file pair must have descended in common. In an example embodiment, merge program 300 (of closure merge provider 140) determines ancestor context closure 137 based on local change context closure 126 and remote change context closure 136 (discussed in further detail with regard to FIG. 3).

In example embodiments, closure merge provider 140 can be a desktop computer, a computer server, or any other computer systems known in the art. In certain embodiments, closure merge provider 140 represents computer systems utilizing clustered computers and components (e.g., database server computers, application server computers, etc.) that act as a single pool of seamless resources when accessed by elements of data processing environment 100 (e.g., client device 120 and server 130). In general, closure merge provider 140 is representative of any electronic device or combination of electronic devices capable of executing computer readable program instructions. Closure merge provider 140 may include components as depicted and described in further detail with respect to FIG. 5, in accordance with embodiments of the present invention.

In one embodiment, closure merge provider 140 is a server computer that acts as an intermediary between client device 120 and server 130. Closure merge provider 140 manages merges of changes to models and files that are hosted by server 130. In various embodiments, closure merge provider 140 includes business logic for managing data that is stored on server 130. In an example embodiment, closure merge provider 140 is a component of an IDE and is associated with server 130. Closure merge provider 140 includes closure generation program 200 and merge program 300. Closure generation program 200 creates a closure of files based on a request from a user (e.g., a user of client device 120), in accordance with embodiments of the present invention. Merge program 300 manages and performs a merge operation of a closure of files, in accordance with embodiments of the present invention. In additional embodiments, closure generation program 200 and merge program 300 can be located and operate on client device 120, server 130, and/or other computing devices and servers (not shown).

Figure 2:
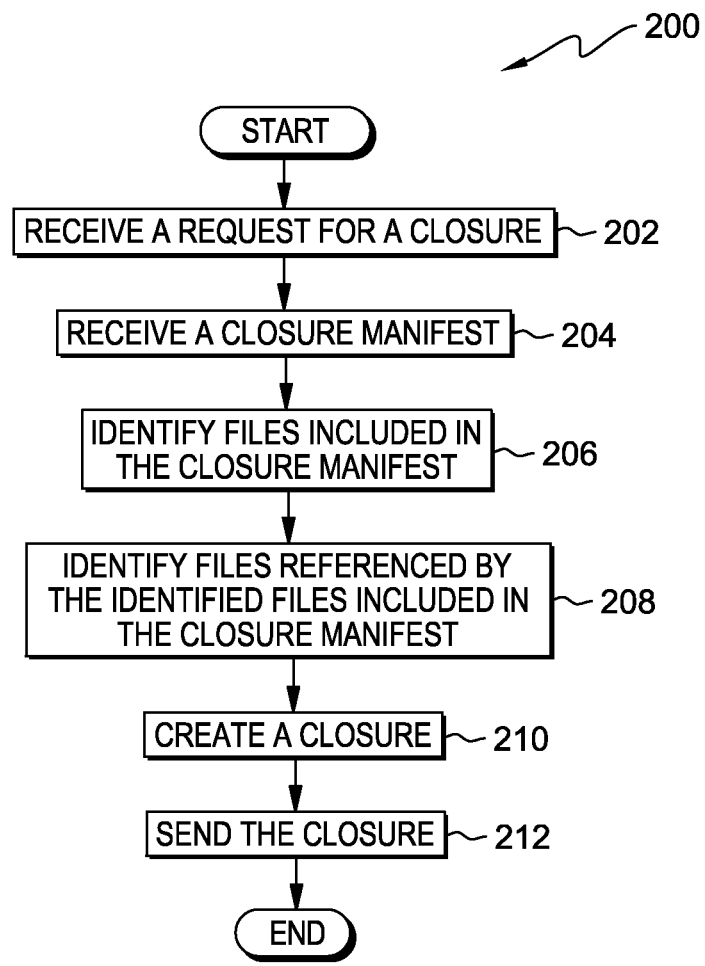
FIG. 2 is a flowchart depicting operational steps of a program for creating a closure of files based on a request from a user, in accordance with an embodiment of the present invention.

FIG. 2 is a flowchart depicting operational steps of closure generation program 200, a program for creating a closure of files based on a request from a user, in accordance with embodiments of the present invention.

In step 202, closure generation program 200 receives a request for a closure. In an example embodiment, closure generation program 200 receives a request for a closure of files (stored on server 130) from client device 120. In one embodiment, the received request includes an indication of a target database, such as storage device 134, where the requested files are stored. Closure generation program 200 initiates in response to receiving a request for a closure. In an example embodiment, closure generation program 200 operates in a parallel development cycle and receives a request from client device 120 for a closure to work on (e.g., to modify).

In step 204, closure generation program 200 receives a closure manifest. In one embodiment, closure generation program 200 receives a closure manifest from client device 120, and the closure manifest is a component of the received request for a closure (received in step 202). A closure manifest includes an indication of a closure and/or files and models to utilize to determine and create a closure. In another embodiment, a closure manifest includes filters that restrict an operation (e.g., creating and sending a closure) to a defined subset of files. In an example embodiment, client device 120 sends a closure manifest that requests a previously defined closure, which are stored on storage device 134 of server 130. In another example embodiment, client device 120 sends a closure manifest that requests a set of files, which are stored on storage device 134 of server 130. In yet another example embodiment, client device 120 sends a closure manifest that requests a previously defined closure and a set of files (not included in the previously defined closure), which are all stored on storage device 134 of server 130. In another embodiment, if closure generation program 200 does not receive a closure manifest, then closure generation program 200 utilizes a previously defined default closure manifest. In yet another embodiment, if closure generation program 200 does not receive a closure manifest, then closure generation program 200 utilizes all files and models that are stored in the user's local workspace or any algorithmically defined subset of the files stored in the target database (e.g., indicated in step 202).

In step 206, closure generation program 200 identifies files included in the closure manifest. In one embodiment, closure generation program 200 utilizes the received closure manifest and identifies the corresponding files that are stored on server 130 and the corresponding storage locations of the files. In another embodiment, closure generation program 200 applies the filters that are included in a received closure manifest to identify the corresponding files that are stored in server 130. In one example, the received closure manifest (received in step 204) includes a request for a previously defined closure (on server 130), and closure generation program 200 identifies the corresponding closure on server 130 (e.g., in storage device 134). In another example, the received closure manifest includes a request for a set of files, and closure generation program 200 identifies the corresponding files on server 130. In yet another embodiment, the received closure manifest includes a request for a previously defined closure and a set of files, closure generation program 200 identifies the corresponding closure and set of files on server 130.

In step 208, closure generation program 200 identifies files referenced by the identified files included in the closure manifest. Files and models that are stored in server 130 can include references to other files and models or components of other files and models. For example, if a model utilizes data that is include in a separate file, then the model can include a reference to the data in the separate file. In one embodiment, closure generation program 200 accesses the identified files included in the closure manifest (identified in step 206) and identifies references to external files or models. Then, closure generation program 200 utilizes the identified references to external files to identify the corresponding files and models (e.g., identifying the storage locations on server 130). In an example, closure generation program 200 accesses a set of files (identified in step 206) and identifies references to one or more additional files. Then, closure generation program 200 utilizes the identified references to identify the storage locations (in server 130) that correspond to the one or more additional files.

In step 210, closure generation program 200 creates a closure. In one embodiment, closure generation program 200 creates a closure that includes the identified files in the closure manifest (from step 206) and the identified files that are referenced by files included in the closure manifest. In other embodiments, closure generation program 200 expands the complete list of files to include the union of all files already determined and any additional files in all of the closures that are represented in the remote closure context, thus providing insurance that all files that have been changed in any closure by the local and all remote users will remain synchronized. Closure generation program 200 creates the closure in a form that closure merge provider 140 is capable of transmitting (e.g., from server 130 to client device 120) via network 110. In an example embodiment, closure generation program 200 creates the closure in a unified modeling language (UML) language format. In another embodiment, the received closure manifest is stored and associated with the created closure so that the created closure can reference the corresponding closure manifest. In another example embodiment, if closure manifest includes a request for a previously defined closure and a set of files (identified in step 206), then closure generation program 200 creates a closure that is an expansion of the previously defined closure and the identified files in the closure manifest (from step 206) and the identified files that are referenced by files included in the closure manifest. In additional embodiments, closure generation program 200 loads a closure of models (e.g., a closure of models that define a complete subsystem) into a workspace associated with an integration context; for example, a stream containing releases of a product.

Figure 4:
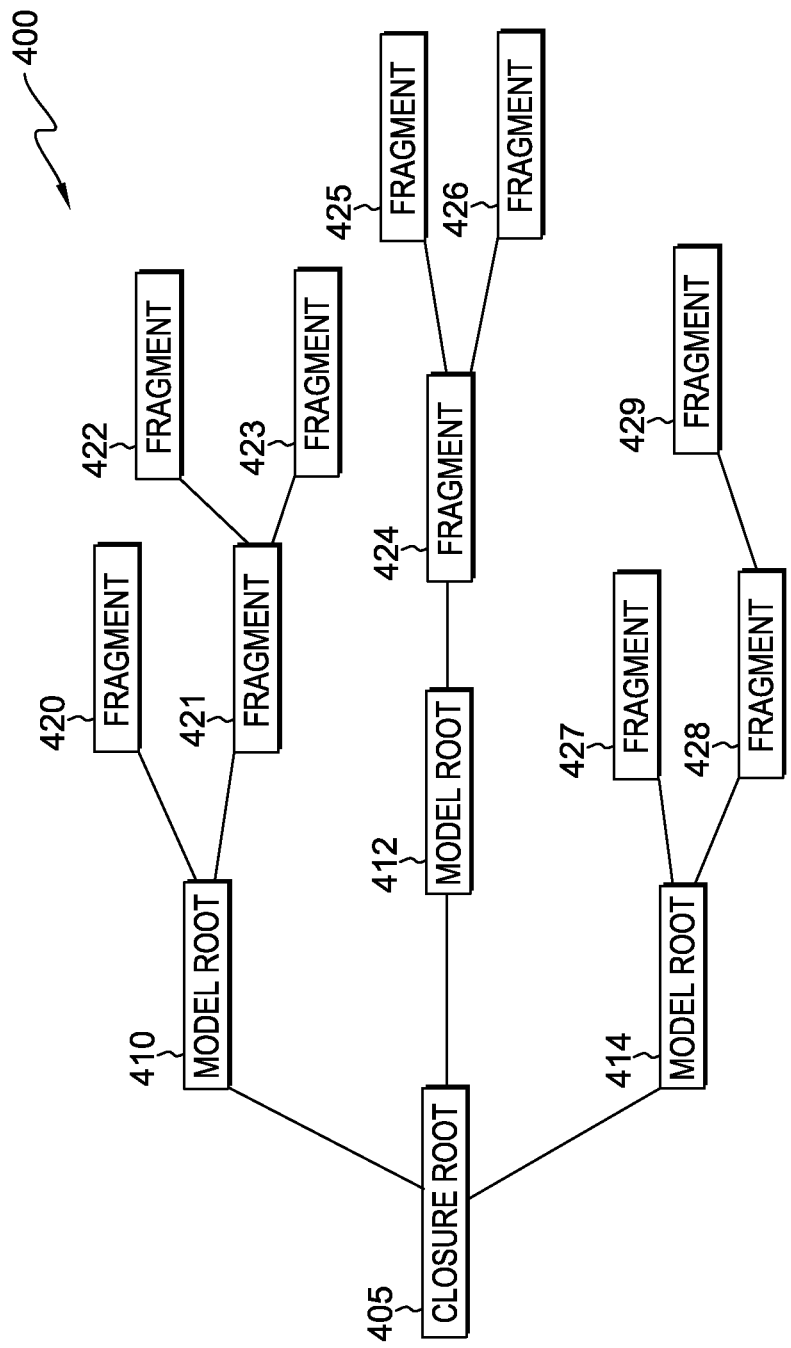
FIG. 4 is a sample tree diagram that depicts the relationships of files in a closure, in accordance with an embodiment of the present invention.

FIG. 4 is a sample tree diagram that depicts closure 400, which depicts the relationships of files in a closure (e.g., created by closure generation program 200 in step 210). In various embodiments, closure 400 includes a plurality of files, including closure root 405, model roots 410, 412, and 414, and fragments 420, 421, 422, 423, 424, 425, 426, 427, 428, and 429. Closure 400 includes closure root 405, which includes references to model roots 410, 412, and 414; and therefore, closure 400 depicts a relationship between closure root 405 and model roots 410, 412, and 414.

In an example, closure generation program 200 receives a request for a closure and a closure manifest (in steps 202 and 204). Closure generation program 200 identifies files included in the closure manifest (in step 206), which includes model roots 410, 412, and 414. Then closure generation program 200 identifies files that are referenced by model roots 410, 412, and 414 (in step 208). The identified reference files include closure root 405 (i.e., a common root file between model roots 410, 412, and 414, and fragments 420, 421, 422, 423, 424, 425, 426, 427, 428, and 429, each of which is referenced by one of the model roots or a fragment referenced by a model root. Closure generation program 200 creates closure 400, a closure that includes the identified files in the closure manifest (from step 206) and the identified files that are referenced by files included in the closure manifest.

In step 212, closure generation program 200 sends the closure. In one embodiment, closure generation program 200 sends the closure (created in step 210) to the computing device (e.g., client device 120) that sent the request for the closure (received in step 202). In an example embodiment, closure generation program 200 sends closure 400 to client device 120, and once a user makes any changes or modifications to closure 400, client device 120 stores the modified version of closure 400 as local change context closure 126.

Figure 3:
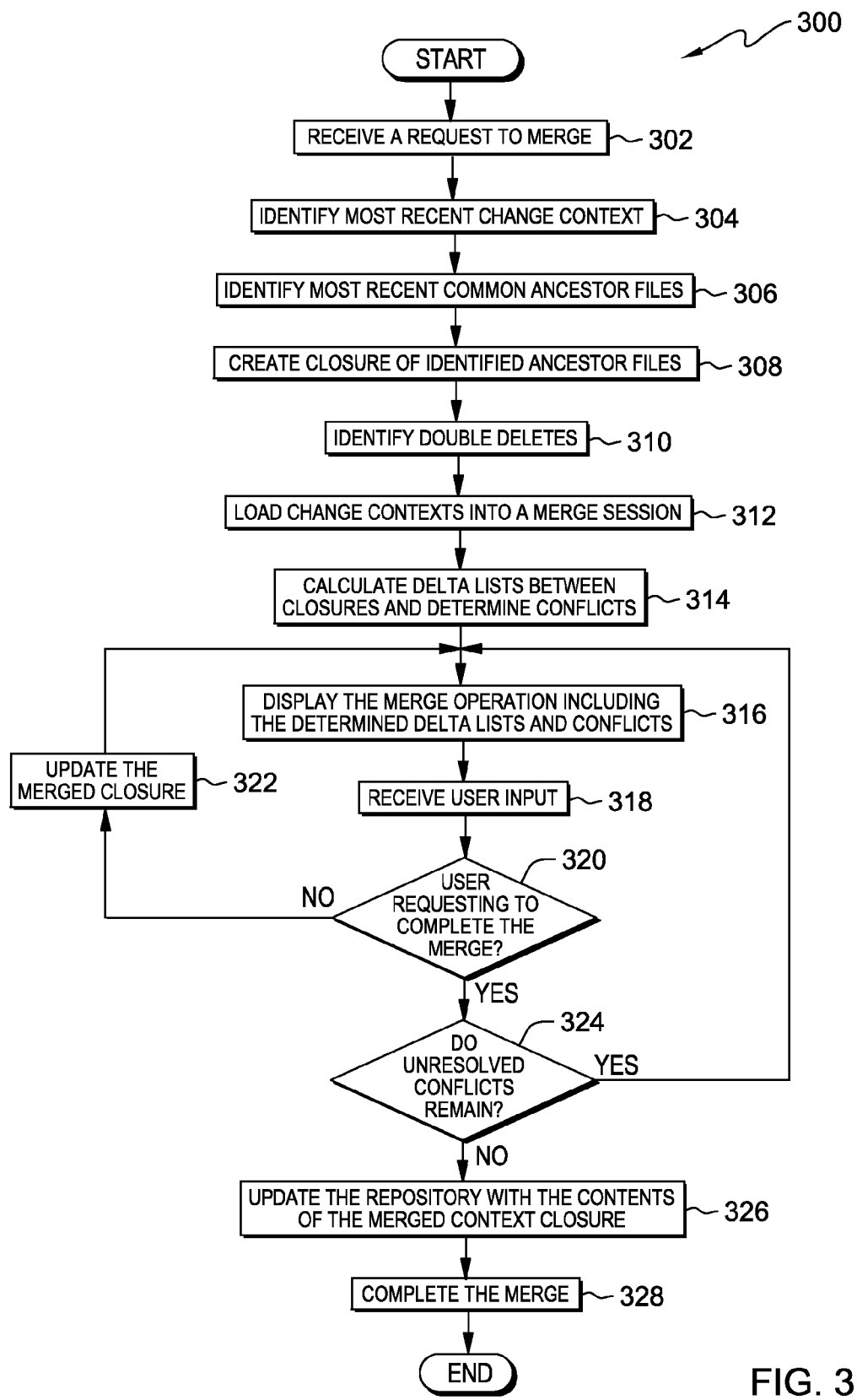
FIG. 3 is a flowchart depicting operational steps of a program for performing a merge operation of a closure of files, in accordance with an embodiment of the present invention.

FIG. 3 is a flowchart depicting operational steps of merge program 300, a program for performing a merge operation of a closure of files, in accordance with embodiments of the present invention. In one embodiment, merge program 300 initiates in response to a user of client device 120 completing edits to local change context closure 126 and sending local change context closure 126 to closure merge provider 140 for merging into server 130 (e.g., via a shared integration stream). In example embodiments, merge program 300 operates to compare changes made to a closure of files (e.g., local change context closure 126) against a set of already accepted changes (e.g., remote change context closure 136) and a set of ancestor files (e.g., ancestor context closure 137).

In step 302, merge program 300 receives a request to merge. In one embodiment, merge program 300 receives a request to merge local change context closure 126 to server 130 from client device 120. In an example embodiment, the request to merge includes a source context (e.g., local change context closure 126) and a target context (e.g., data in storage device 134 corresponding to the source context and defined by the remote change context closure 136).

In step 304, merge program 300 identifies a most recent change context. In one embodiment, merge program 300 identifies remote change context closure 136, which is the most recent set of approved and merged changes for the closure of files that corresponds to local change context closure 126 (i.e., changes to the same closure of files). In various embodiments, remote change context closure 136 includes the up-to-date versions of the files and models that are included in local change context closure 126. In some embodiments, remote change context closure 136 contains every file that was a member of a closure that was changed in parallel with the closure defined by the local change context closure 126, such that synchronization across all changed files in all participating remote change contexts is achieved.

In step 306, merge program 300 identifies the most recent common ancestor files. In one embodiment, merge program 300 accesses local change context closure 126 (received in step 302) and remote change context closure 136 (identified in step 304) and identifies the most recent common ancestor files in ancestor files 135. In an example, local change context closure 126 includes a modification to fragment 421 of closure 400 (FIG. 4) made by a user of client device 120 and remote change context closure 136 includes a modification to fragment 421 of closure 400 made by another user (not shown). Merge program 300 accesses ancestor files 135 and identifies the most recent stored ancestor file that corresponds to fragment 421. In various embodiments, the most recent common ancestor file is the ancestor file that was created or approved closest to the current time, but not before the time that client device 120 received fragment 421, since an ancestor file is a previous version of fragment 421. Merge program 300 identifies a common ancestor file for each file in local change context closure 126 and remote change context closure 136.

In step 308, merge program 300 creates a closure of the identified ancestor files. In one embodiment, merge program 300 creates ancestor context closure 137, which is a closure of the identified most recent common ancestor files between local change context closure 126 and remote change context closure 136 (identified in step 306). In an example embodiment, merge program 300 creates the closure in a unified modeling language (UML) language format. In another embodiment, merge program 300 can store ancestor context closure 137 on closure merge provider 140. In an example where local change context closure 126 and remote change context closure 136 represent changes to closure 400, ancestor context closure 137 includes the most recent common ancestor files (from ancestor files 135) for closure root 405, model roots 410, 412, and 414, and fragments 420, 421, 422, 423, 424, 425, 426, 427, 428, and 429 between local change context closure 126 and remote change context closure 136. In an additional embodiment, ancestor context closure 137 includes the identified most recent common ancestor files between local change context closure 126 and remote change context closure 136 and also any additional files that are referenced by the identified most recent common ancestor files.

In step 310, merge program 300 identifies double deletes. In one embodiment, merge program 300 analyzes local change context closure 126, remote change context closure 136, and ancestor context closure 137 to identify double deletes. A double delete file is a file that is present in the set of ancestor files (e.g., ancestor context closure 137) but is not present in either local change context closure 126 or remote change context closure 136. In an example, ancestor context closure 137 can include a fragment file that is referenced by a model root file, but local change context closure 126 and remote change context closure 136 do not include the fragment file. In this example, merge program 300 identifies the fragment file as a double delete file. Examples of changes that can eliminate a fragment file include deletion of the fragment file's logical model contents or absorption of the fragment into its parent fragment or model root file. A change of this type to the same file in both the local change context closure 126 and remote change context closure 136 will create a double delete file. Merge program 300 identifies double delete files so that a suitable common ancestor may be identified and thus, included in the ancestor context closure 137 in order for merge program 300 to perform a correct merge.

In step 312, merge program 300 loads the change contexts into a merge session. In one embodiment, merge program 300 loads local change context closure 126, remote change context closure 136, ancestor context closure 137, and merged context closure 127. In an example embodiment, merged context closure 127 starts as a copy of ancestor context closure 137, and merge program 300 processes the closure (e.g., applies deltas to the closure) to create the final merged version of the closure (i.e., merged context closure 127). Merge program 300 loads the closures into memory (e.g., data model structures, structures in a modeling framework, or other forms of in-memory data models) to facilitate comparison of individual structural elements and determines the deltas between local change context closure 126 and ancestor context closure 137, and again between remote change context closure 136 and ancestor context closure 137. In another embodiment, merge program 300 loads the change contexts into memory (e.g., memory 506) of closure merge provider 140 and/or memory of server 130 (e.g., in an in-memory format for data models) in order to perform the merge locally or remotely using network 110 to communicate between software components. Merge program 300 loads each change context into memory as a complete and single memory image of the closure, allowing the merge operation for the change contexts to be accomplished in a single merge session. In an example embodiment, merge program 300 loads remote change context closure 136 and ancestor context closure 137 from an integration stream to perform the merge, then commits the final merged change contexts back into the integration stream, which is hosted in memory of server 130 and/or managed by closure merge provider 140 using change management program 132.

In step 314, merge program 300 calculates delta lists between closures and determines conflicts. In one embodiment, merge program 300 performs the merge operation utilizing local change context closure 126, remote change context closure 136, and ancestor context closure 137, which were loaded into memory (in step 312). To perform a merge operation (requested in step 302), merge program 300 determines two lists of deltas between ancestor context closure 137 and the two change context closures (i.e., local change context closure 126 and remote change context closure 136). Merge program 300 then analyzes the two delta lists and determines conflicts between the deltas that were found in the change context included in the request to merge (e.g., local change context closure 126 or another change context received or indicated in step 302) and the most recent change context (e.g., remote change context closure 136 or another change context identified in step 304), based off the comparison of each to a closure of common ancestor files (e.g., ancestor context closure 137). In another embodiment, merge program 300 performs a rebase operation of the integration context (e.g., remote change context closure 136) into the local change context of files hosted on server 130 and/or locally on a workspace in client device 120, which involves a merge of one or more files and models (e.g., new files being copied and changed files being merged if necessary). In an additional aspect, merge program 300 provides the option of scaling the merge session based on the size of the set of changed files inside the models (i.e., a sparse memory image of the portions of each model that have changed) rather than the size of all of the full models (i.e., a complete memory image of every model in every closure).

In one embodiment, merge program 300 utilizes delta generators to determine differences between a change context and the corresponding ancestor files. For example, merge program 300 utilizes delta generators to determine differences between local change context closure 126 and ancestor context closure 137 and differences between ancestor context closure 137 and remote change context closure 136. To determine differences between local change context closure 126 and ancestor context closure 137, merge program 300 utilizes a delta generator that performs the operation of "local minus ancestor," which subtracts the models in ancestor context closure 137 from the models in local change context closure 126 by crawling the logical model elements from the top of the closure. The "local minus ancestor" operation produces a list of deltas in logical model elements and/or files from local change context closure 126 that are either different than, not present in ancestor context closure 137, or no longer present in local change context closure 126. Therefore, if two files match in both ancestor context closure 137 and local change context closure 126, then the 'local minus ancestor" delta generator in merge program 300 can optionally remove the two files, and the resulting list of deltas to logical model elements or files includes only the files that do not match, are new, or are missing. To determine differences between remote change context closure 136 and ancestor context closure 137, merge program 300 utilizes a delta generator that performs the operation of "remote minus ancestor," which subtracts the files in ancestor context closure 137 from remote change context closure 136. In various example embodiments, merge program 300 performs the "remote minus ancestor" delta generator operation similarly to the "local minus ancestor" operation but replacing remote change context closure 136 for local change context closure 126. The "remote minus ancestor" operation produces a list of deltas to logical model elements and files from remote change context closure 136 that are either different than, not present in ancestor context closure 137, or no longer present in remote change context 136.

Merge program 300 utilizes the delta generators to generate two lists for comparison, a list for the "local minus ancestor" operation and a list for the "remote minus ancestor" operation. The two generated lists include the "deltas," which are the logical model elements and files that are different (i.e., have experienced a modification). In another embodiment, merge program 300 utilizes a conflict analyzer to compare the two generated lists and determine conflicts. Merge program 300 utilizes a conflict analyzer to identify conflicts between the delta lists for remote change context closure 136 and local change context closure 126 because conflicts can cause damage to a closure or associated files if conflicting files are merged. In various embodiments, conflict processing and identification (e.g., a conflict analyzer) takes place at the logical model level, and in the case of closure processing, across the entire closure. When merge program 300 processes a closure as a complete atomic unit, it is possible for merge program 300 to identify both deltas and conflicts across an entire group of models in a workspace. Merge program 300 operates (in step 314) to determine each conflict that exists, which may negatively affect the requested merge operation. In various embodiments, the presence of an accurate set of deltas (e.g., produced by the delta generators) that map back to the original files can provide an increase in accuracy of conflict identification.

In one example, local change context closure 126 includes a modification to move a set of data from "File A" into "File B," but remote change context closure 136 does not include File B (e.g., File B was previously deleted from the closure). In this example, merge program 300 utilizes the delta generators, which generate the two lists that include the difference of remote change context closure 136 not including File B (among other differences). Then, merge program 300 utilizes a conflict analyzer and identifies the conflict, i.e., local change context closure 126 includes a modification to move a set of data from File A in Model AA into File B in Model BB, but remote change context closure 136 does not include File B in Model BB. In this example, if a user or automatic process accepts the deletion delta of File B from Model BB (as present in remote context closure 136) and also accepts the movement of data from File A in Model AA into File B in Model BB (as present in local context closure 126), the result is that File B remains deleted and the data that had been moved into File B from File A is also lost along with File B. This is a "data loss" scenario that can be prevented by analyzing conflicts across an entire closure of models instead of just locally to a model or even just a fragment. In additional embodiments, merge program 300 can utilize a plurality of additional methods to identify and determine conflicts between local change context closure 126, remote change context closure 136, and ancestor context closure 137.

In step 316, merge program 300 displays the merge operation including the determined delta lists and conflicts. In one embodiment, merge program 300 displays the merge operation (performed in step 314) and the determined deltas and conflicts (determined in step 314) to a user of client device 120 (e.g., via application 124 and user interface 122). In another embodiment, merge program 300 performs step 316 concurrently with step 314. Merge program 300 displays the determined conflicts and allows input from a user (e.g., a user of client device 120 or another user associated with the requested merge operation) to resolve the conflicts and/or change the state of non-conflicting deltas (i.e., to reject some of the changes from either local change context closure 126 or remote change context closure 136). In an example embodiment, merge program 300 presents the conflicts as an "either or" decision between the logical model element or file in local change context closure 126 and the logical model element or file in remote change context closure 136 or a decision to reject both logical model elements or files and choose the logical model element or file state in ancestor context closure 137. Merge program 300 allows a first change, a second change, or neither change and does not provide an option to perform the merger of both change (since an error will occur because of the determined conflict and potentially corrupt the data). Merge program 300 also displays the identified "double deletes" (identified in step 310) to client device 120. In another embodiment, changes to logical model elements containing text (e.g., portions of pure text, code segments, or any other script or programming language that might make up a logical model element's contents) that conflict are offered the option of a "submerge" or embedded merge session, thus creating a new "merged" state. This state becomes another resolution option for a conflict along with the local, remote, and ancestor states.

In step 318, merge program 300 receives user input. In various embodiments, merge program 300 receives input from a user to resolve a displayed conflict or change the state of a delta (e.g., from accepted to rejected, or rejected to accepted). In one embodiment, merge program 300 receives input of a selection into user interface 122 from a user of client device 120 (i.e., the user that requested the merge in step 302). In an example embodiment, merge program 300 receives input from the user of client device 120 indicating a selection of one of the displayed choices (displayed in step 316). In another embodiment, merge program 300 can receive input of an automated response (e.g., from client device 120, server 130, etc.) to resolve a displayed conflict; for example, resolving a conflict in a pre-defined case such as a double delete. For example, merge program 300 can display conflicts that occur at the logical model element level (e.g., in a visual merge), and merge program 300 can utilize an automated merge for conflicts that occur at a file level but not at the logical model element level (e.g., the conflicting data in the files has changes that occur on different logical model elements and are thus compatible deltas). In various embodiments, conflicts that occur at the file level (e.g., changes to the file contents) with no conflicts found in the contained logical model elements are treated as conflicts by change management program 132, which has purview only over the files themselves, and as logical element deltas by merge program 300, which has purview over both the files and their contents. This allows merge program 300 to resolve file deltas and conflicts automatically while presenting logical model element conflicts to the user for manual resolution.

In step 320, merge program 300 determines whether the user is requesting completion of the merge. If the user input (received in step 318) is not a request to complete the merge, then merge program 300 proceeds to step 322 and updates the merged closure (e.g., merged context closure 127 or another closure stored in memory) with the new state (based on the received user input). Updating the merged closure involves applying or removing the delta (or deltas) that were included in the received user input to the merged context closure 127. This input changes the state of one or more deltas, which in turn may or may not resolve one or more conflicts. Merge program 300 utilizes the received input (from step 318), which indicates a state change for a delta (accept or reject), or for a conflict the acceptance or rejection of a first delta, a second delta, or neither delta, and thus, merge program 300 resolves the conflict utilizing the indicated selection. In one example, local change context closure 126 includes a modification to move a set of data from "File A" into "File B," but remote change context closure 136 does not include File B (e.g., File B was previously deleted from the closure). Merge program 300 (in step 316) displays a determined conflict that local change context closure 126 includes a modification to move a set of data from File A into File B, but remote change context closure 136 does not include File B. Then, merge program 300 receives (in step 318) input selecting "delete File B." In this example, merge program 300 does not merge the modification from local change context closure 126 (i.e., moving a set of data from File A into File B) and instead merges (or maintains a previously merge modification) the modification from remote change context closure 136 (i.e., deleting File B). In other embodiments, merge program 300 can receive and merge other inputs associated with possible modifications to local change context closure 126, remote change context closure 136, and ancestor context closure 137.

In response to determining that the user input (received in step 318) is a request to complete the merge, merge program 300 proceeds to step 324 and determines whether unresolved conflicts remain, based on which the merge will either continue or complete. If conflicts remain in the merge session to be resolved, then merge program 300 returns to step 316 (decision step 324, yes branch) with a message that all conflicts must be resolved, and the merge session continues waiting for more user input. If all conflicts in the merge session are resolved, then merge program 300 proceeds to step 326 (decision step 324, no branch) to write the merged closure into the repository. In one embodiment, merge program 300 determines whether the input (received in step 318) changes the physical file structure of merged context closure 127. For example, an input that affects model structure is rejecting a re-factoring operation that creates or removes a fragment of a closure, which means that a previously saved structural change must be reversed when updating the repository (in step 326). In an example embodiment, merge program 300 compares the structure of a closure before the received input is applied in comparison to after the input is applied to determine whether the input affects the structure. In another embodiment, merge program 300 determines that a user rejection of a fragment creation delta or fragment deletion delta (possibly as the side effect of absorption of the content into the parent fragment or model root or deletion of the entire contents of the fragment) reverses a previous structural change to the repository; and thus, reinstates the originally removed fragment or removes the originally created fragment.

In step 326, merge program 300 updates the repository with the contents of the merged context closure. More specifically, in response to determining that unresolved conflicts do not remain, merge program 300 updates the repository with the contents of the merged context closure 127. In one embodiment, merge program 300 determines the actual physical file changes (including all files that contain changed logical model elements and all files that have been eliminated or restored based on user inputs) and then writes the files to the repository (e.g., into an integration stream, to corresponding files in storage device 134, or other file storage locations). In various embodiments, the new files are written to a workspace on the client device 120, and then change management program 132 is asked to write the new files into the repository as an example directly to a stream or branch from which remote change context closure 136 was loaded. Merge program 300 writes the new files as new versions of the files of the same name from remote change context closure 136. At this point, merge program 300 has changed remote change context closure 136 to match merged context closure 127.

In step 328, merge program 300 completes the merge. More specifically, in response to determining that all the conflicts have been resolved (decision step 324, "yes" branch), merge program 300 has written out the merged context closure 127 and now completes the merge operation.

Figure 5:
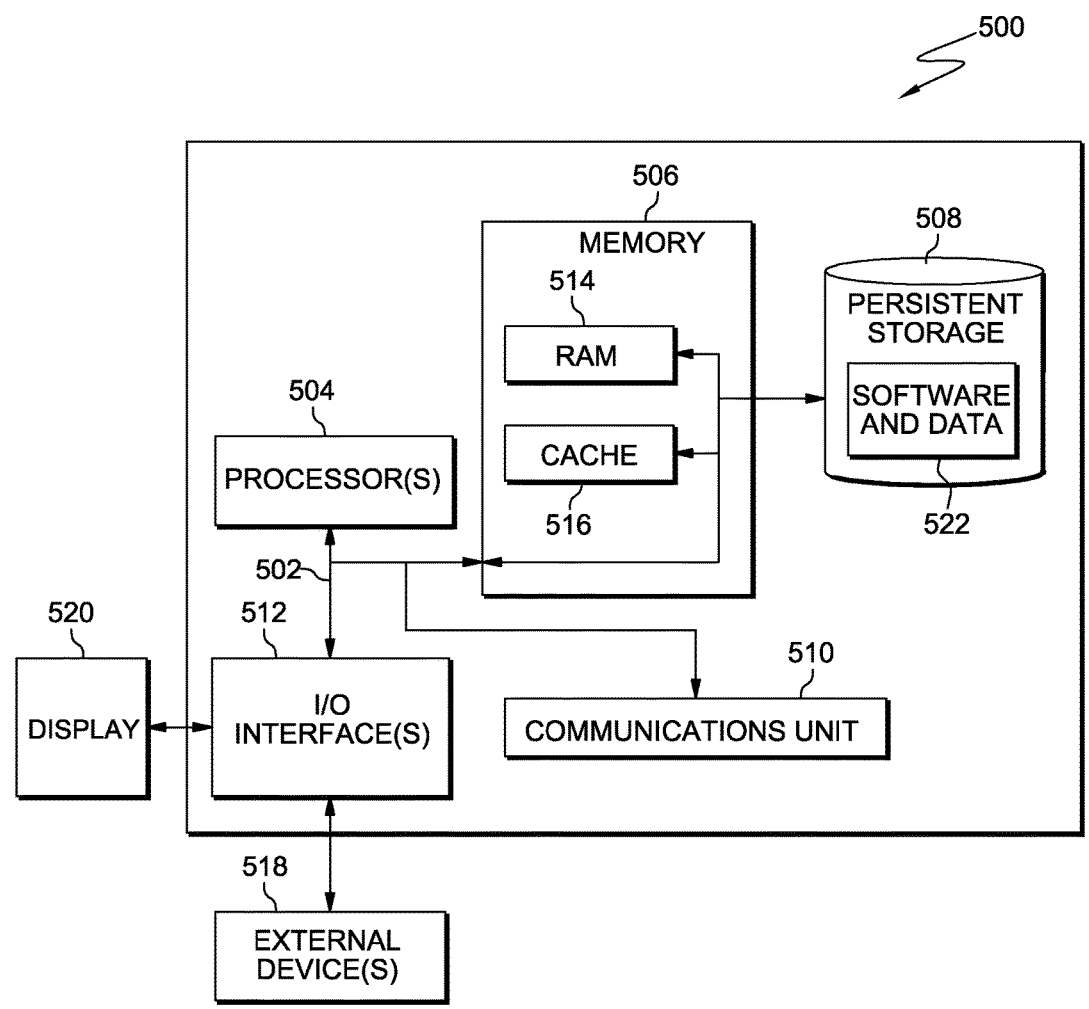
FIG. 5 depicts a block diagram of components of a computing system representative of the client device, server, and closure merge provider of FIG. 1, in accordance with an embodiment of the present invention.

FIG. 5 depicts a block diagram of components of computer 500, which is representative of client device 120, server 130, and closure merge provider 140, in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer 500 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer readable storage media. In this embodiment, memory 506 includes random access memory (RAM) 514 and cache memory 516. In general, memory 506 can include any suitable volatile or non-volatile computer readable storage media. Software and data 522 are stored in persistent storage 508 for access and/or execution by processors 504 via one or more memories of memory 506. With respect to client device 120, software and data 522 includes application 124 and local change context closure 126. With respect to server 130, software and data 522 includes change management program 132, ancestor files 135, remote change context closure 136, and ancestor context closure 137. With respect to closure merge provider 140, software and data 522 includes closure generation program 200 and merge program 300.

In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 may include one or more network interface cards. Communications unit 510 may provide communications through the use of either or both physical and wireless communications links. Software and data 522 may be downloaded to persistent storage 508 through communications unit 510.

I/O interface(s) 512 allows for input and output of data with other devices that may be connected to computer 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data 522 can be stored on such portable computer readable storage media and can be loaded onto persistent storage 508 via I/O interface(s) 512. I/O interface(s) 512 also can connect to a display 520.

Display 520 provides a mechanism to display data to a user and may be, for example, a computer monitor. Display 520 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for data management, the method comprising:
    identifying, by one or more processors, a source closure, a target file set, and a previously merged closure, wherein the source closure is a closure of files that includes changed files to merge into the target file set, and wherein the previously merged closure is a closure of files previously merged into the target file set;
    loading, by one or more processors, the identified source closure, the previously merged closure, and a closure of ancestor files shared by the identified source closure and the previously merged closure into a merge session; and
    determining, by one or more processors, one or more file merge conflicts in the merge session based on differences between a comparison of the identified source closure to the closure of ancestor files and a comparison of the previously merged closure to the closure of ancestor files, wherein the one or more file merge conflicts include a file that is present in the closure of ancestor files but is not present in either the identified source closure or the previously merged closure.

2. The method of claim 1, further comprising:
    receiving, by one or more processors, input resolving at least one of the determined one or more file merge conflicts.

3. The method of claim 2, further comprising:
    determining, by one or more processors, whether the received input includes a request to complete the merge session;
    responsive to determining that the received input does not include a request to complete the merge session, updating, by one or more processors, the closure of ancestor files in the merge session based on the received input; and
    determining, by one or more processors, an updated set of one or more file merge conflicts in the merge session.

4. The method of claim 2, further comprising:
    determining, by one or more processors, whether the received input includes a request to complete the merge session;
    responsive to determining that the received input does include a request to complete the merge session, determining, by one or more processors, whether the merge session includes at least one unresolved determined file merge conflict; and
    responsive to determining that merge session does include at least one unresolved determined file merge conflict, determining, by one or more processors, an updated set of one or more file merge conflicts in the merge session.

5. The method of claim 2, further comprising:
    determining, by one or more processors, whether the received input includes a request to complete the merge session;
    responsive to determining that the received input does include a request to complete the merge session, determining, by one or more processors, whether the merge session includes at least one unresolved determined file merge conflict; and
    responsive to determining that merge session does not include at least one unresolved determined file merge conflict, updating, by one or more processors, the closure of ancestor files in the merge session based on the received input.

6. The method of claim 1, wherein the determining one or more file merge conflicts in the merge session based on differences between a comparison of the identified source closure to the closure of ancestor files and a comparison of the previously merged closure to the closure of ancestor files, further comprises:
    determining, by one or more processors, a first delta list between the identified source closure and the closure of ancestor files, wherein a delta list includes differences between two or more closures of files;
    determining, by one or more processors, a second delta list between the previously merged closure and the closure of ancestor files; and
    identifying, by one or more processors, conflicts between the first delta list and the second delta list.

7. The method of claim 1, further comprising:
    identifying, by one or more processors, one or more files in the merge session that are present in the closure of ancestor files but are not present in either the identified source closure or the previously merged closure.

8. The method of claim 1, further comprising:
    identifying, by one or more processors, for each file included in the identified source closure and the previously merged closure, a most recent common ancestor file, wherein the previously merged closure is a most recent set of approved and merged files corresponding to files in the identified source closure; and creating, by one or more processors, the closure of ancestor files to include the identified most recent common ancestor files.

9. The method of claim 1, where a closure of files is a closure of models that includes all files that make up the models in the closure.

10. A computer program product for data management, the computer program product comprising:

one or more computer readable storage media and program instructions stored on the one or more computer readable storage media, the program instructions comprising:

program instructions to identify a source closure, a target file set, and a previously merged closure, wherein the source closure is a closure of files that includes changed files to merge into the target file set, and wherein the previously merged closure is a closure of files previously merged into the target file set;

program instructions to load the identified source closure, the previously merged closure, and a closure of ancestor files shared by the identified source closure and the previously merged closure into a merge session; and program instructions to determine one or more file merge conflicts in the merge session based on differences between a comparison of the identified source closure to the closure of ancestor files and a comparison of the previously merged closure to the closure of ancestor files wherein the one or more file merge conflicts include a file that is present in the closure of ancestor files but is not present in either the identified source closure or the previously merged closure.

11. The computer program product of claim 10, further comprising program instructions, stored on the one or more computer readable storage media, to:

receive input resolving at least one of the determined one or more file merge conflicts.

12. The computer program product of claim 11, further comprising program instructions, stored on the one or more computer readable storage media, to:

determine whether the received input includes a request to complete the merge session;

responsive to determining that the received input does not include a request to complete the merge session, update the closure of ancestor files in the merge session based on the received input; and determine an updated set of one or more file merge conflicts in the merge session.

13. The computer program product of claim 11, further comprising program instructions, stored on the one or more computer readable storage media, to:

determine whether the received input includes a request to complete the merge session;

responsive to determining that the received input does include a request to complete the merge session, determine whether the merge session includes at least one unresolved determined file merge conflict; and responsive to determining that merge session does include at least one unresolved determined file merge conflict, determine an updated set of one or more file merge conflicts in the merge session.

14. The computer program product of claim 11, further comprising program instructions, stored on the one or more computer readable storage media, to:

determine whether the received input includes a request to complete the merge session;

responsive to determining that the received input does include a request to complete the merge session, determine whether the merge session includes at least one unresolved determined file merge conflict; and responsive to determining that the merge session does not include at least one unresolved determined file merge conflict, update the closure of ancestor files in the merge session based on the received input.

15. The computer program product of claim 10, wherein the program instructions to determine one or more file merge conflicts in the merge session based on differences between a comparison of the identified source closure to the closure of ancestor files and a comparison of the previously merged closure to the closure of ancestor files, further comprises program instructions to:

determine a first delta list between the identified source closure and the closure of ancestor files, wherein a delta list includes differences between two or more closures of files;

determine a second delta list between the previously merged closure and the closure of ancestor files; and identify conflicts between the first delta list and the second delta list.

16. The computer program product of claim 10, further comprising program instructions, stored on the one or more computer readable storage media, to:

identify one or more files in the merge session that are present in the closure of ancestor files but are not present in either the identified source closure or the previously merged closure.

17. The computer program product of claim 10, further comprising program instructions, stored on the one or more computer readable storage media, to:

identify, for each file included in the identified source closure and the previously merged closure, a most recent common ancestor file, wherein the previously merged closure is a most recent set of approved and merged files corresponding to files in the identified source closure; and create the closure of ancestor files to include the identified most recent common ancestor files.

18. A computer system for data management, the computer system comprising:

one or more computer processors;

one or more computer readable storage media; and program instructions stored on the computer readable storage media for execution by at least one of the one or more processors, the program instructions comprising:

program instructions to identify a source closure, a target file set, and a previously merged closure, wherein the source closure is a closure of files that includes changed files to merge into the target file set, and wherein the previously merged closure is a closure of files previously merged into the target file set;

program instructions to load the identified source closure, the previously merged closure, and a closure of ancestor files shared by the identified source closure and the previously merged closure into a merge session; and program instructions to determine one or more file merge conflicts in the merge session based on differences between a comparison of the identified source closure to the closure of ancestor files and a comparison of the previously merged closure to the closure of ancestor files, wherein the one or more file merge conflicts include a file that is present in the closure of ancestor files but is not present in either the identified source closure or the previously merged closure.

19. The computer system of claim 18, further comprising program instructions, stored on the computer readable storage media for execution by at least one of the one or more processors, to:
   receive input resolving at least one of the determined one or more file merge conflicts.

20. The computer system of claim 19, further comprising program instructions, stored on the computer readable storage media for execution by at least one of the one or more processors, to:
   determine whether the received input includes a request to complete the merge session;
   responsive to determining that the received input does not include a request to complete the merge session, update the closure of ancestor files in the merge session based on the received input; and
   determine an updated set of one or more file merge conflicts in the merge session.

21. The computer system of claim 19, further comprising program instructions, stored on the computer readable storage media for execution by at least one of the one or more processors, to:
   determine whether the received input includes a request to complete the merge session;
   responsive to determining that the received input does include a request to complete the merge session, determine whether the merge session includes at least one unresolved determined file merge conflict; and
   responsive to determining that merge session does include at least one unresolved determined file merge conflict, determine an updated set of one or more file merge conflicts in the merge session.

22. The computer system of claim 19, further comprising program instructions, stored on the computer readable storage media for execution by at least one of the one or more processors, to:
   determine whether the received input includes a request to complete the merge session;
   responsive to determining that the received input does include a request to complete the merge session, determine whether the merge session includes at least one unresolved determined file merge conflict; and
   responsive to determining that merge session does not include at least one unresolved determined file merge conflict, update the closure of ancestor files in the merge session based on the received input.

23. The computer system of claim 18, wherein the program instructions to determine one or more file merge conflicts in the merge session based on differences between a comparison of the identified source closure to the closure of ancestor files and a comparison of the previously merged closure to the closure of ancestor files, further comprises program instructions to:
   determine a first delta list between the identified source closure and the closure of ancestor files, wherein a delta list includes differences between two or more closures of files;
   determine a second delta list between the previously merged closure and the closure of ancestor files; and
   identify conflicts between the first delta list and the second delta list.

24. The computer system of claim 18, further comprising program instructions, stored on the computer readable storage media for execution by at least one of the one or more processors, to:
   identify one or more files in the merge session that are present in the closure of ancestor files but are not present in either the identified source closure or the previously merged closure.

25. The computer system of claim 18, further comprising program instructions, stored on the computer readable storage media for execution by at least one of the one or more processors, to:
   identify, for each file included in the identified source closure and the previously merged closure, a most recent common ancestor file, wherein the previously merged closure is a most recent set of approved and merged files corresponding to files in the identified source closure; and
   create the closure of ancestor files to include the identified most recent common ancestor files.

* * * * *